(12) United States Patent
Yamamoto et al.

(10) Patent No.: US 6,490,124 B1
(45) Date of Patent: Dec. 3, 2002

(54) MEMBER FOR REMOVING FOREIGN PARTICLES WITHIN A CARTRIDGE STORING SPACE OF A DISK CARTRIDGE TO BE INSERTED INTO/REMOVED FROM A DISK DRIVE APPARATUS

(75) Inventors: Kazuyuki Yamamoto, Kanagawa (JP); Kazuo Takahashi, Tokyo (JP); Toshio Mamiya, Tokyo (JP); Takashi Yamada, Tokyo (JP); Yotaro Sanada, Tokyo (JP)

(73) Assignee: Sony Corporation, Tokyo (JP)

( * ) Notice: Subject to any disclaimer, the term of this patent is extended or adjusted under 35 U.S.C. 154(b) by 105 days.

(21) Appl. No.: 09/614,525

(22) Filed: Jul. 12, 2000

(30) Foreign Application Priority Data

Jul. 13, 1999 (JP) ............................. 11-199474

(51) Int. Cl.[7] .............................. G11B 33/14
(52) U.S. Cl. .................. 360/97.02; 360/97.04
(58) Field of Search .......... 360/97.02, 97.03, 360/97.04

(56) References Cited

U.S. PATENT DOCUMENTS 4,771,412 A * 9/1988 Aihara et al. ............... 369/75.1
5,418,775 A * 5/1995 Okatani .................... 360/97.02
5,694,267 A * 12/1997 Morehouse et al. ........ 206/592

* cited by examiner

*Primary Examiner*—David Davis
(74) *Attorney, Agent, or Firm*—Frommer Lawrence Haug LLP; William S. Frommer; Matthew K. Ryan

(57) ABSTRACT

To perform a high dustproof when a disk drive apparatus records and/or reproduces information signals on a disk shape recording medium, which is stored rotatably within a disk cartridge. The present invention provides a disk drive apparatus for recording and/or reproducing information signals on a disk shape recording medium, which is stored rotatably within a disk cartridge comprising a case having a cartridge storing space in which the disk cartridge is inserted, rotatably driving means for holding the disk shape recording medium, which is stored within the disk cartridge, which is inserted in the cartridge storing space and for rotatably driving the disk shape recording medium, shielding means for defining a shielded space by covering a surrounding area of the rotatably driving means for holding the disk shape recording medium and a filter for removing a dust or the like inside of the cartridge storing space. The shielded space and the cartridge storing space communicate each other via said filter.

7 Claims, 10 Drawing Sheets

MEMBER FOR REMOVING FOREIGN PARTICLES WITHIN A CARTRIDGE STORING SPACE OF A DISK CARTRIDGE TO BE INSERTED INTO/REMOVED FROM A DISK DRIVE APPARATUS

BACKGROUND OF THE INVENTION

1. Field of the Invention

The present invention relates to a disk drive apparatus for recording and/or reproducing a recording medium with a disk shape such as a magnetic disk or an optical disk, which is stored rotatably inside a disk cartridge.

2. Prior Art

The conventional art, for example, may be exemplified by a Removable Hard Disk Drive (hereinafter referred to as an R-HDD) as a mass storage device, which is used in an information processing apparatus such as a computer. The R-HDD records or reproduces information signals on a magnetic disk, which is rotatably stored inside a disk cartridge. The disk cartridge may be used detachably for the R-HDD.

FIG. 1 shows an embodiment of a configuration of an R-HDD. FIG. 2 shows an embodiment of a configuration of a disk cartridge to be stored in the R-HDD.

As shown in FIG. 1, the R-HDD 100 comprises a spindle motor 102, a chucking magnet 103, a head actuator 105 and a holder 106 inside an apparatus body 101 of an R-HDD 100, in which a disk cartridge is inserted. The spindle motor 102 rotatably drives the magnetic disk, which is rotatably stored inside the disk cartridge. The chucking magnet 103 comprises a permanent magnet attached to the spindle motor 102. The head actuator 105 is provided with a floating head slider 104, on which a magnet head for recording or reproducing the information signals on the magnetic disk is mounted, at a head end. The holder 106 holds the disk cartridge that is inserted inside the apparatus body 101.

On the other hand, as shown in FIG. 2, in a disk cartridge 200, a magnetic disk 201 is clipped by a cartridge body 204, comprising an upper half 202 and a lower half 203. In this arrangement, an approximately center of the magnetic disk 201 is provided with a hub 205. The hub 205 comprises a ferromagnetic body designed to chuck using a permanent magnet. On the contrary, in the cartridge body 204, an opening (hereinafter referred to as an opening for a hub) 206 is defined on an approximately center of the lower half 203. The opening 206 causes the hub 205 attached to the magnetic disk 201 to face outside. The cartridge body 204 is provided with an opening (hereinafter referred to as an opening for a head) 207 at a portion of the build-up-peripheral-wall 204a of the side face. The opening 207 causes the head actuator 105 of the R-HDD 100 to approach inside of the disk cartridge 200. Further, in order to prevent the dust or the like from inserting therein, the disk cartridge 200 is provided with a shutter mechanism 208 for shutting up the opening for the hub 206 and the opening for the head 207 when they are not used.

In the R-HDD 100, when the disk cartridge 200 is inserted inside of the apparatus body 101, the opening for the hub 206 and the opening for the head 207 of the disk cartridge 200 are open. Then, the disk cartridge 200 comes down toward the spindle motor 102 together with the holder 106. At this time, the hub 205 of the magnetic disk 201 facing to outside from the opening for the hub 206 of the disk cartridge 200 is stuck to the chucking magnet 103 attached to the spindle motor 102. As a result of that, the spindle motor 102 can hold the magnetic disk 201, which is stored in the disk cartridge 200.

In the R-HDD 100, upon reproducing the record, the spindle motor 102 rotatably drives the magnetic disk 201, which is stored inside the disk cartridge 200. Also in the R-HDD 100, if the magnetic disk 201 is rotatably driven at a predetermined number of rotations, the head actuator 105 approaches from the opening for the head 207 of the disk cartridge 200. Then, the floating head slider 104 attached to the head end of the head actuator 105 records or reproduces the information signals on the magnetic disk 201 by the magnet head mounted on the floating head slider 104. At the same time, the floating head slider 104 is floating slightly by the air film which is generated between the floating head slider 104 and the magnetic disk 201 which is rotating.

In the R-HDD 100, the disk cartridge 200 is discharged from the apparatus body 101 of the R-HDD 100 by an adverse operation to the above stated operation when the usage of the disk cartridge 200 was over.

As described above, upon recording or reproducing the information signals on the magnetic disk 201 which is stored inside of the disk cartridge 200, R-HDD 100 is provided with the floating slider 104, floating over a surface for recording signals of the magnetic disk 201, which is rotating with a minute distance according to an aerodynamic influence. As a result of that, the magnet head, which is mounted, on the floating slider 104 and the magnetic disk 201 can be prevented from being touched to be worn out.

However, in the R-HDD 100, the magnetic disk 201 is rotating at a high speed as the floating head slider 104 is floating over a main surface of the magnetic disk 201 which is rotating with a minute distance, for example, some tens of nano meters. On this account, the R-HDD 100 is very weak for the dust or the like. Accordingly, if the dust or the like inserts inside of the disk cartridge 200 and it sticks to the surface of the magnetic disk 201, even the very minute dust may cause the disk cartridge 200 to record the information signals defectively. Further, in some instances, it is feared that the dust or the like inserts between the magnetic disk 201 and the floating head slider 104 so that the magnetic disk 201 is damaged and the magnet head mounted on the floating head slider 104 is physically clashed (head clash).

The magnetic disk 201 rotates inside of the disk cartridge 200 so that airflow is generated on the main surface of the magnetic disk 201 in the R-HDD 100. Then, a kind of influence caused by a centrifugal pump is generated, so that a vicinity of a rotation center of the magnetic disk 201 inside of the disk cartridge 200 comes to have a negative pressure. As a result of that, outside air containing the dust or the like communicates through the opening for the hub 206, which is provided on the center portion of the lower half 203 of the cartridge body 204, to flow into inside of the disk cartridge 200. At the same time, air inside of the disk cartridge 200 flows out from the opening for the head 207, which is disposed on the build-up-peripheral-wall 204a of the side face of the disk cartridge body 204.

Therefore, there was the case that the outside air containing the dust or the like flowed into the opening for the hub 207 in the R-HDD 100, so that the inside of the disk cartridge 200 was polluted.

Also, there was the case that the outside air containing the dust or the like flowed into the inside of the apparatus body 101 of the R-HDD 100, inserted the disk cartridge 200, even from a small gap of the apparatus body 101 due to spreading or locally decreasing of a pressure. As a result of that, the inside of the apparatus body 101 and the inside of the disk cartridge 200 was polluted.

There is an idea that a surrounding area of the opening for the hub 206 of the disk cartridge 200 is shielded by a shielding member to prevent the outside air containing the dust or the like from flowing into the inside of the R-HDD 100. However, since the vicinity of the rotation center of the magnetic disk 201 inside of the disk cartridge 200 comes to have a negative pressure in the R-HDD 100, a pressure of the vicinity of the spindle motor 102 for holding the magnetic disk 201 also comes down. Thus, there is a problem that a grease inside of the spindle motor 102, an operational fluid or air bubbles inside of the magnet fluid seal blows out to pollute the inside of the disk cartridge 200.

BRIEF SUMMARY OF THE INVENTION

The present invention has been made taking the foregoing problem into consideration, an object of which is to provide a disk drive apparatus for performing a high dustproof when recording and/or reproducing information signals on a disk shape recording medium, which is stored rotatably inside of a disk cartridge.

A disk drive apparatus for recording and/or reproducing information signals on a disk shape recording medium, which is stored rotatably within a disk cartridge comprises a case having a cartridge storing space in which the disk cartridge is inserted, rotatably driving means for holding the disk shape recording medium, which is stored within the disk cartridge, which is inserted in the cartridge storing space and for rotatably driving the disk shape recording medium, shielding means for defining a shielded space by covering a surrounding area of the rotatably driving means for holding the disk shape recording medium and a filter for removing a dust or the like inside of the cartridge storing space. The shielded space and said cartridge storing space communicate each other via said filter.

In the above arrangement of the disk drive apparatus, the disk shape recording medium, which is stored inside of the disk cartridge is rotatably driven by rotating driving means, so that the pressure in the surrounding area of the rotating driving means for holding the disk shape recording medium becomes negative.

A shielded space covering the surrounding area of the rotating driving means is defined by the shielding means in this disk drive apparatus. The rotating driving means holds the disk shape recording medium. Therefore, air containing the dust or the like does not flow into the inside of the disk cartridge from a surrounding area of the rotating driving means for holding the recording medium in the disk, so that the inside of the disk cartridge may be kept clean. In this disk drive apparatus, the shielded space communicates to the cartridge storing space via a filter. Accordingly, air, which is cleaned by a filter, can be supplied from the cartridge storing space to the shielded space, that is, into the inside of the disk cartridge. As a result, the dust or the like does not pollute the inside of the disk cartridge so that a pressure in the shielded area can be prevented from extremely lowering.

The air in the cartridge storing space of the disk drive apparatus is inlet to the shielded space side through the filter. Accordingly, the air in the cartridge storing space can be cleaned.

The pressure in the cartridge storing space of the disk drive apparatus is higher than the pressure in the outside, so that the outside air containing the dust or the like can be prevented from flowing into the cartridge storing space.

The shielding means covers the outer circumference of the rotatably driving means and preferably comprises a member of connecting under pressure configured so as to connect to the disk cartridge under pressure. Thus, the shielded space can be shielded with high accuracy to prevent the dust from inserting into the inside of the disk cartridge. The member for connecting under pressure is preferably made of an elastic material.

The filter is preferably arranged so as to be positioned in a vicinity of the side face in said cartridge storing space, in which said disk cartridge is inserted.

In the above case, it is possible to collect the dust, which is inserted from the outside of the cartridge storing space, effectively so as to clean the inside of the cartridge storing space.

The disk cartridge is provided with an opening in which a head for recording and/or reproducing said disk shape recording medium is inserted. The filter is preferably arranged so as to be positioned in a vicinity of the opening, which is defined in the disk cartridge of the cartridge storing space when the disk cartridge is stored in the cartridge storing space.

In the above case, it is possible to utilize a filter with a less pressure loss. Accordingly, a pressure in the shielded area can be prevented from extremely lowering.

The filter is preferably arranged to be positioned so as not to overlap with the disk cartridge in the cartridge storing space when the disk cartridge is stored in the cartridge storing space.

In the above case, it is possible to utilize the inside of the cartridge storing space effectively to thicken a wall of the filter.

The disk drive apparatus preferably comprises a supporting plate for supporting the driving means. The shielded space and the cartridge storing space preferably communicate with each other via a duct line having a linear groove which passes through a rotation center of the disk shape recording medium, which is defined on the supporting plate.

In this state, it is possible to suppress the rigidity of a supporting plate for supporting the driving means so that vibrations occurred in the supporting plate can be prevented.

As described above in detail, the disk drive apparatus according to the present invention is provided with the shielded space for covering the surrounding area of the rotating driving means, which is defined by the shielding means in the disk drive apparatus. The rotating driving means holds the disk shape recording medium. Therefore, the air containing the dust or the like does not flow into the inside of the disk cartridge from the surrounding area of the rotating driving means for holding the recording medium in the disk, so that the inside of the disk cartridge may be kept clean. In this disk drive apparatus, the shielded space and the cartridge storing space communicate with each other via a filter. Accordingly, the air, which is cleaned by a filter, can be supplied from the cartridge storing space to the shielded space, that is, into the inside of the disk cartridge. As a result, the dust or the like does not pollute the inside of the disk cartridge so that a rapid decrease in pressure in the shielded area can be prevented.

The air in the cartridge storing space of the disk drive apparatus is inlet to the shielded space side through the filter. Accordingly, the air in the cartridge storing space can be cleaned.

The pressure in the cartridge storing space of the disk drive apparatus is higher than the pressure in the outside, so that the outside air containing the dust or the like can be prevented from flowing into the cartridge storing space.

Therefore, according to the disk drive apparatus of the present invention, a high dustproof can be obtained when recording and/or reproducing the information signals on the disk shape recording medium, which is stored rotatably inside of the disk cartridge.

DETAILED DESCRIPTION OF THE INVENTION

Embodiments of the present invention will be explained below with reference to the drawings.

Figure 1:
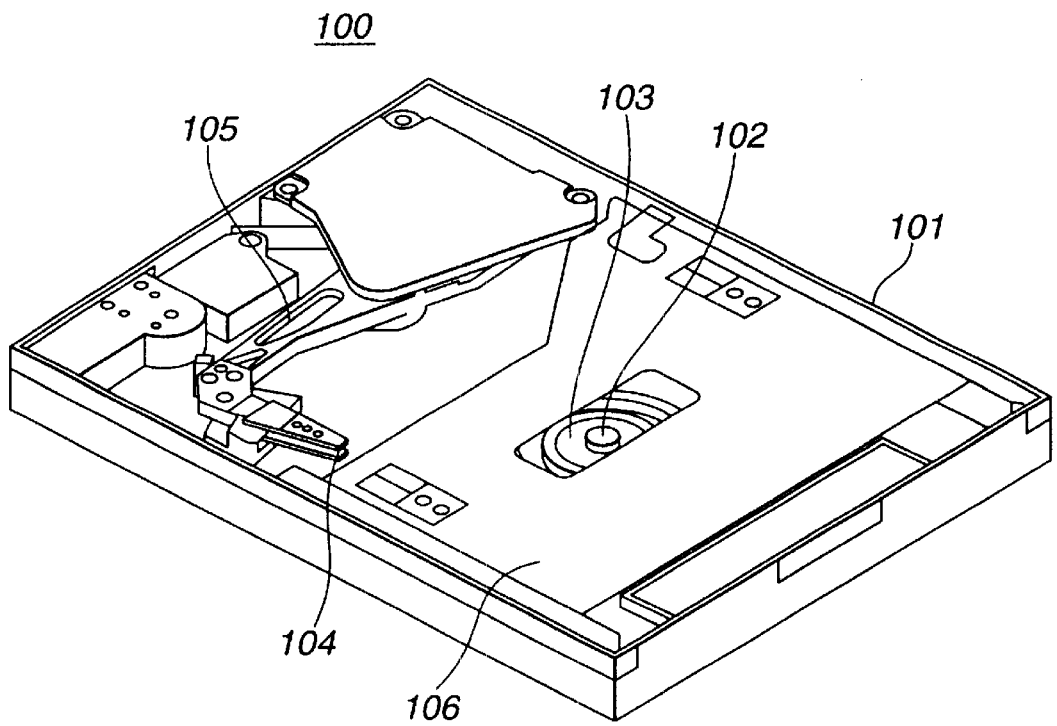
FIG. 1 is a schematic perspective view for illustrating a conventional disk drive apparatus.
Figure 2:
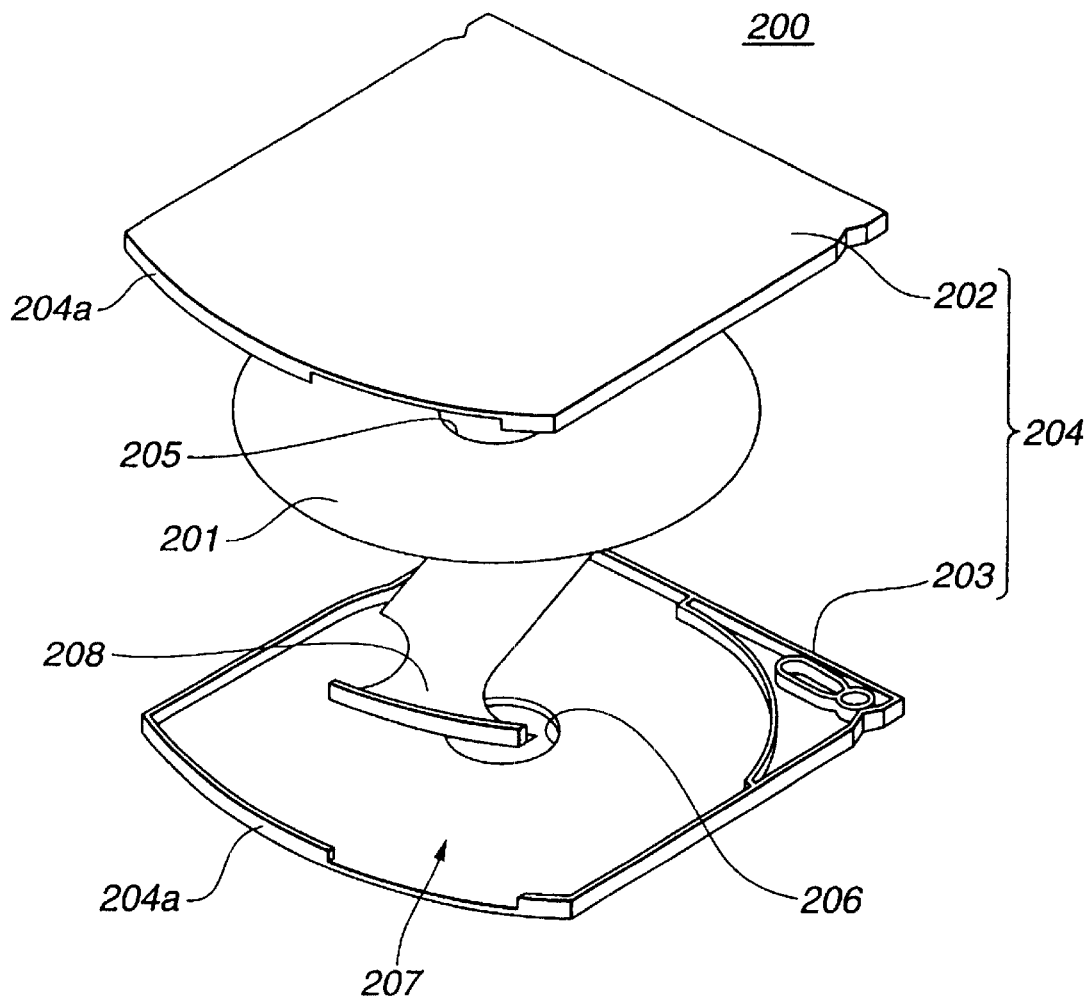
FIG. 2 is an exploded perspective view for illustrating a configuration of a disk cartridge to be stored in the disk drive apparatus in FIG. 1.
Figure 3:
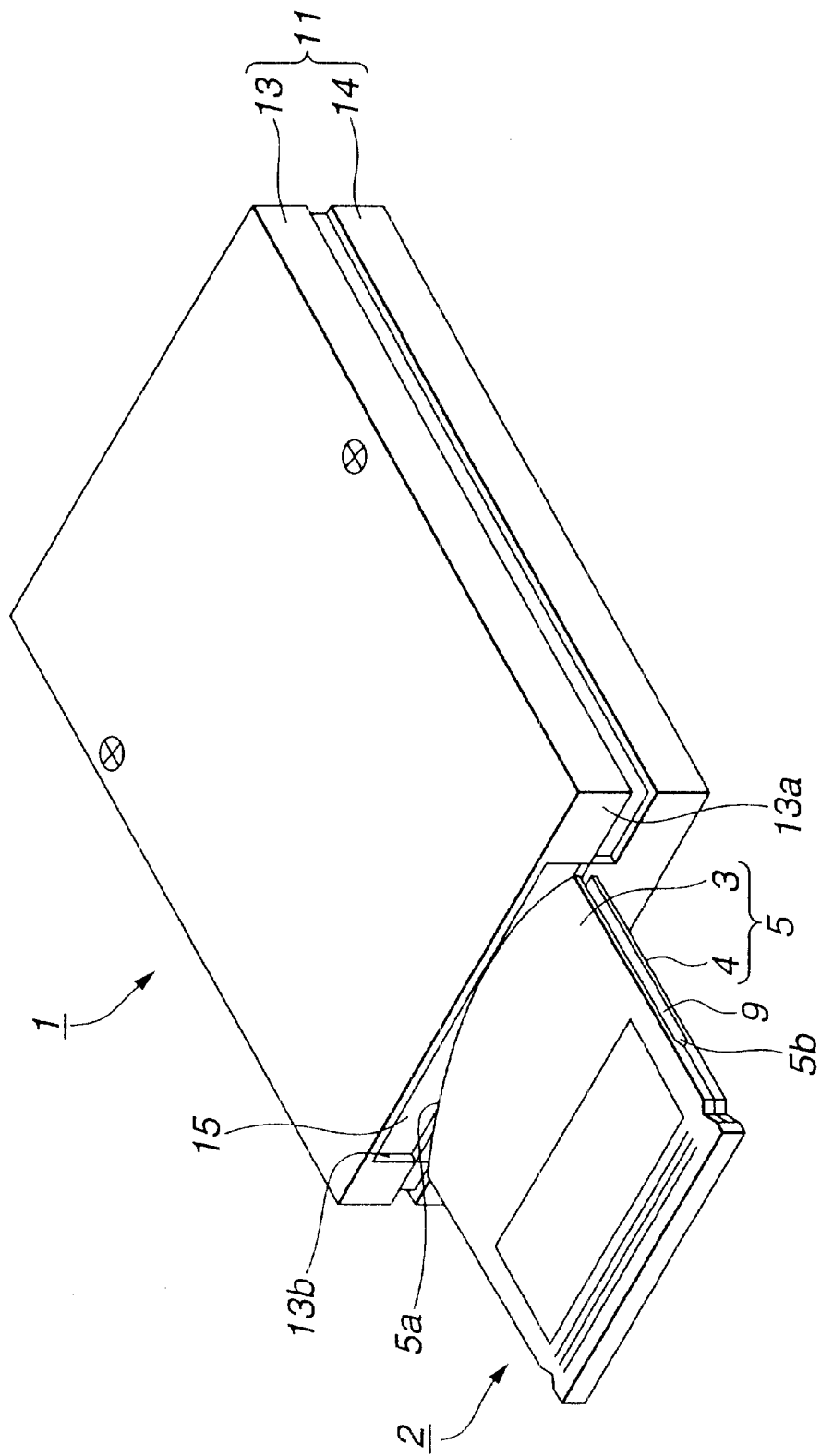
FIG. 3 is a perspective view for illustrating an embodiment of a disk drive apparatus and a disk cartridge according to the present invention.

A disk drive apparatus 1 according to an embodiment of the present invention shown in FIG. 3 is a so-called removable hard disk apparatus. The disk drive apparatus 1 records or reproduces informational signals on a magnetic disk, which is rotatably stored in the inside of a disk cartridge 2. The disk cartridge 2 is a so-called removable hard disk and it can be used detachably to the disk drive 1.

Figure 4:
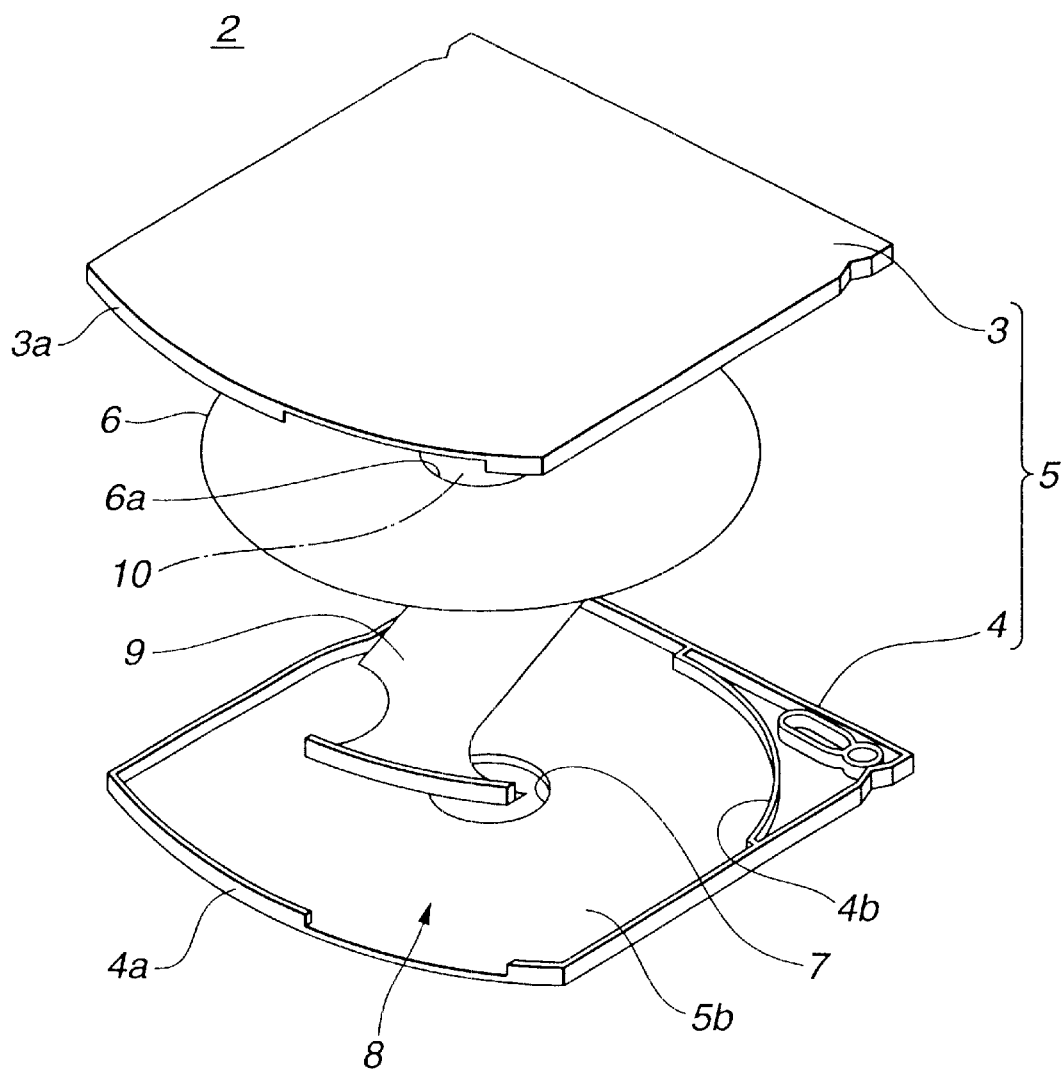
FIG. 4 is an exploded perspective view for illustrating a configuration of a disk cartridge to be stored in the disk drive apparatus according to the present invention.
Figure 5:
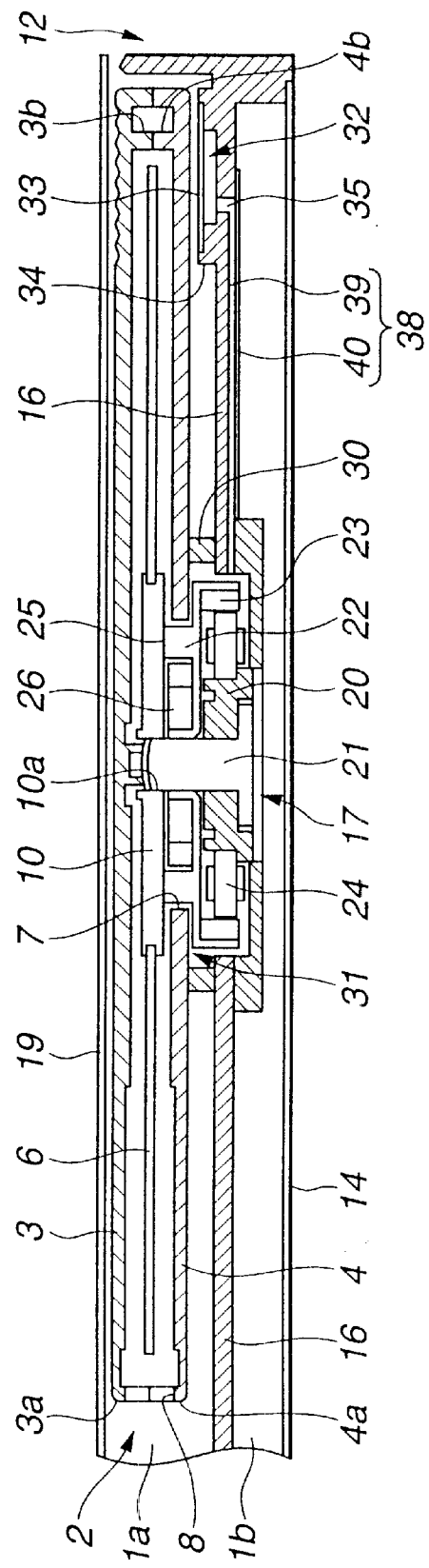
FIG. 5 is a schematic cross sectional view for illustrating a disk cartridge stored in the disk drive apparatus according to the present invention.

At first, the disk cartridge 2 to be stored in the disk drive 1 of the present invention will be explained. FIG. 4 is an exploded perspective view for illustrating a configuration of the disk cartridge 2. FIG. 5 is a schematic cross sectional view for illustrating the disk cartridge 2 stored in the disk drive apparatus 1.

The disk cartridge 2, as shown in FIG. 3 and FIG. 5, brings together a pair of an upper half 3 and a lower half 4 and comprises a cartridge body 5 and a magnetic disk 6. Peripheral portions of the cartridge body 5 are connected by a plurality of screws or an adhesive and the magnetic disk 6 is rotatably stored in the inside of the cartridge body 5.

The cartridge body 5 is made of synthetic resin or the like. In the cartridge body 5, an end face 5a to be inserted in the disk drive apparatus 1 is approximately formed by a circular arc so as to have a curvature which is about the same as an outline of a magnetic disk 6 stored in the inside of the disk drive apparatus 1. In the upper half 3 and the lower half 4, build-up-peripheral-walls 3a, 4a and party walls 3b, 4b are respectively provided. The build-up-peripheral-walls 3a and 4a define a periphery of the cartridge body 5. The party walls 3b and 4b are provided so as to inscribe the build-up-peripheral-walls 3a and 4a. The party walls 3b and 4b also define a space in which the magnetic disk 6 is rotatably stored when the upper half 3 and the lower half 4 are brought together.

In the cartridge body 5, an opening (hereinafter referred to as an opening for a hub) 7 for facing a hub which is disposed on the magnetic disk 6 to the outside is defined on an approximately center portion of the lower half 4. With respect to the magnetic disk 6, the detail explanation will be given later. The opening for the hub 7 is approximately formed by a circle and has a sufficient size for a disk table disposed on a spindle motor of the disk drive apparatus 1 to be inserted therein. With respect to the disk drive apparatus 1, the detail explanation will be given later.

Further, in the cartridge body 5, an opening (hereinafter referred to as an opening for a head) 8 for inserting a head actuator of the disk drive 1 into the inside thereof is defined on a portion of the build-up-peripheral-walls 3a and 4a of the end face 5a to be inserted in the disk drive apparatus 1. With respect to the disk drive 1, the detail explanation will be given later. The opening for the head 8 is formed approximately by a rectangle and has a size such that a floating head slider disposed on a top end of the head actuator can control a surface for recording the information signals of the magnetic disk 6 across an inner and an outer periphery thereof.

The disk cartridge 2 is provided with a shutter mechanism 9 for shutting the opening for the hub 7 and the opening for the head 8 to prevent the dust or the like from inserting into them when the disk cartridge is not used. The shutter mechanism 9 is provided with a lever and a shutter. The lever faces to the outside from one side 5b of the cartridge body 5, which is approximately on a parallel with the direction that the disk cartridge 2 inserts and ejects. The shutter is formed being integrated with the lever and shuts the opening for the hub 7 and the opening for the head 8. When the disk cartridge is not used, the shutter is accompanied by force with a spring or the like in the direction to shut the opening for the hub 7 and the opening for the head 8. If the disk cartridge 2 is inserted into the disk drive apparatus 1, the shutter mechanism 9 works with a shutter release mechanism disposed on the side face of the disk drive apparatus 1 so that the lever slides against the force by the spring. Accordingly, the shutter slides to open the opening for the hub 7 and the opening for the head 8.

The magnetic disk 6 is a so-called hard disk and is formed by sequentially stacking a magnetic layer of a protection layer on the disk plate with a center hole in the approximately center portion. A hub 10 for chucking by a permanent magnet is provided on the center hole of the magnetic disk 6. The hub 10 is made of a strong magnetic material and it is fixed by caulking, screwing and bonding or the like. Further, a hub hole 10a is defined on the approximately center portion of the hub 10. The hub hole 10a fits a supporting axis of a spindle motor of the disk drive 1. With respect to the disk drive 1, the detail explanation will be given later.

Figure 6:
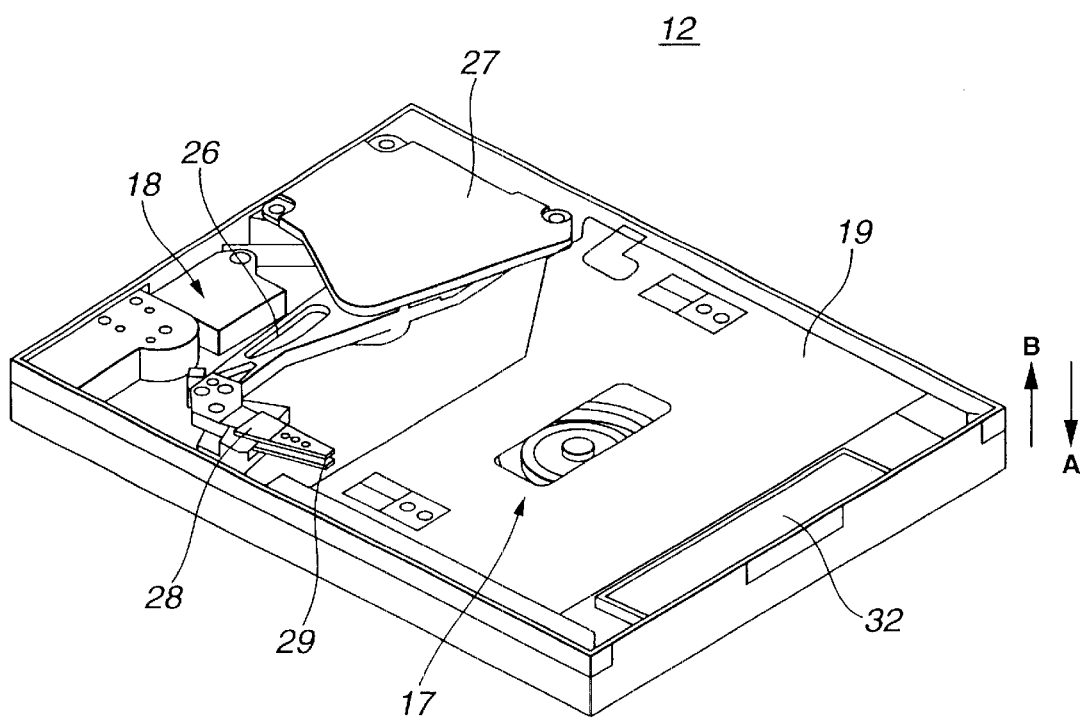
FIG. 6 is a schematic perspective view for illustrating the disk drive apparatus in FIG. 3 with omission of an upper cover of the disk drive apparatus.
Figure 7:
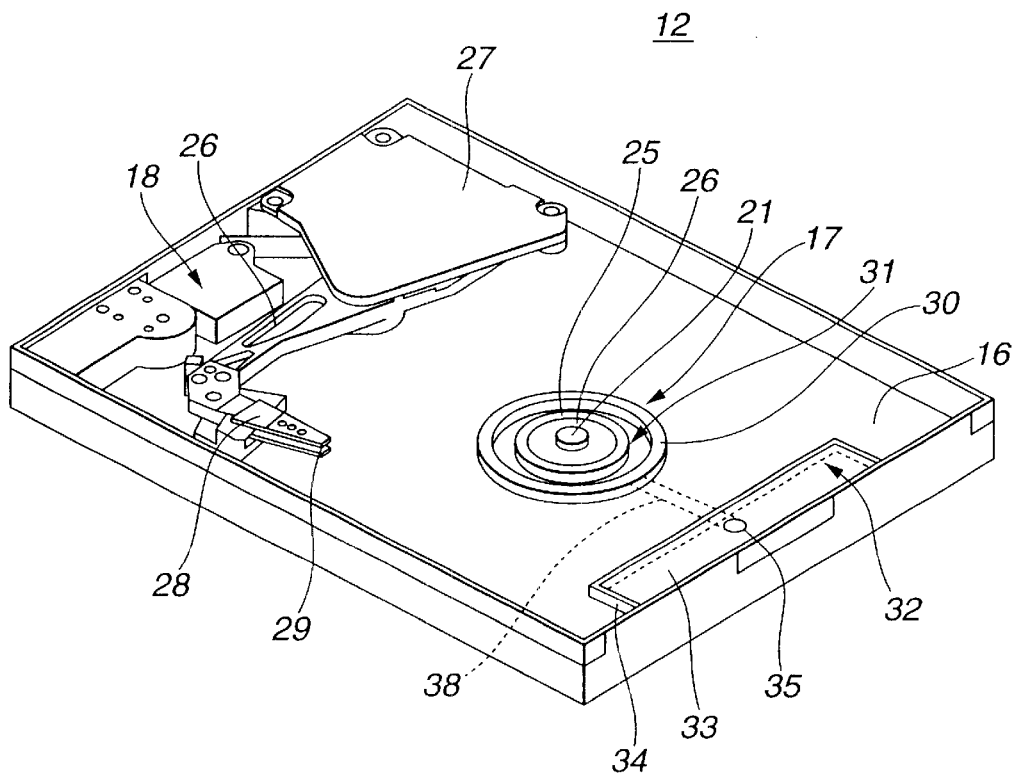
FIG. 7 is a schematic perspective view for illustrating the disk drive apparatus in FIG. 6 with omission of a holder of the disk drive apparatus.

The disk drive apparatus 1 according to the present invention will be explained below. FIG. 6 is a schematic perspective view for illustrating the disk drive apparatus 1 in FIG. 3 with omission of an upper cover of the disk drive apparatus 1. Further, FIG. 7 is a schematic perspective view for illustrating the disk drive apparatus 1 in FIG. 6 with omission of a holder of the disk drive apparatus 1.

The disk drive apparatus 1 is provided with a case 11 and a disk drive body 12 as shown in FIG. 3 and FIG. 5. The case 11 is an exterior cladding and the apparatus body 12 is incorporated within the case 11.

As shown in FIG. 3, the case 11 for preventing the dust or the like from inserting into the apparatus body 12 comprises an upper cover 13 and a lower cover 14. The upper cover 13 is fixed on an upper portion of the apparatus body 12 by screws or the like. The lower cover 14 is fixed on a bottom portion of the apparatus body 12 by the screws or the like.

The upper cover 13 is provided with an opening (hereinafter referred to as a cartridge inserter/ejector opening) 13b for inserting and ejecting the disk cartridge 2 and a shutter 15 for shutting the cartridge inserter/ejector opening 13b at a front panel 13a. As shown in FIG. 5, a cartridge storing space 1a for storing the disk cartridge 2 therein is defined inside of the case 11. The cartridge storing space 1a is connected to the cartridge inserter/ejector opening 13b. On the other hand, a shielded space 1b is defined between the lower cover 14 and a chassis 16 comprising a bottom portion of the apparatus body 12.

As shown in FIG. 5 through FIG. 7, the apparatus body 12 comprises a spindle motor 17, a head actuator 18 and a holder 19 on the chassis 16. The spindle motor 17 rotatably drives the magnetic disk 6 stored within the disk cartridge 2. The head actuator 18 records or reproduces the information signals on the magnetic disk 6, which is stored inside of the disk cartridge 2. The holder 19 holds the disk cartridge 2, which is inserted in a case 11.

The spindle motor 17 is provided on an approximately center portion of the cartridge storing space 1a, as shown in FIG. 5 and FIG. 7. The spindle motor 17 comprises a motor housing 20, a spindle axis 21, a rotor 22, a rotor magnet 23 and a drive coil 24. The motor housing 20 comprises a stator yoke. The spindle axis 21 is rotatably disposed on the center portion of the motor housing 20 through a bearing. The rotor 22 is fixed on a vicinity of an upper end of the spindle axis 21 to be accommodated within the motor housing 20. The rotor magnet 23 is disposed on an inner periphery of the rotor 22. The driving coil 24 is disposed on the side face of the motor housing 20 opposing to the rotor magnet 23. A disk table 25 is horizontally formed integrally with an upper surface of the rotor 22. Further, a chucking magnet 26 made of a circle pennanent magnet is horizontally imbedded in the disk table 25.

In the spindle motor 17, electric power supply to the driving coil 24 generates a magnetic field. Due to a magnetic influence between the driving coil 24 and a rotor magnet 23 which is opposed to the driving coil 24, the disk table 25, which forms to be integral with the rotor 22, rotatably drives along with the spindle axis 21.

The head actuator 18 is provided in the opposing direction to the cartridge inserter/ejector opening 13b of the cartridge storing space 1a as shown in FIG. 6 and FIG. 7. The head actuator 18 comprises a rotating arm 26, a voice coil motor 27, a suspension 28 and a floating head slider 29. The rotating arm 26 is supported by an axis on the chassis 16. The voice coil motor 27 is disposed on one side of the rotating arm 26 and the suspension 28 with predetermined elasticity is provided on other side of the rotating arm 26. The floating head slider 29 is mounted on an end portion of the suspension 28.

The voice coil motor 27 comprises a coil, which is disposed on the side face of the rotating arm 26 and a magnet, which is disposed on the side face of the chassis 16 in the opposing direction of the coil. In the voice coil motor 27, electric power supply to the coil generates a magnetic field. Due to a magnetic influence between the coil and a magnet, which is opposed to the coil, the rotating arm 26 rotates by a predetermined angle.

The suspension 28 gives strength to the floating head slider 29 in the direction of the magnetic disk 6 by elasticity. A magnet head is loaded with the floating head slider 29 for recording or reproducing the information signals on the magnetic disk 6.

As shown in FIG. 5 and FIG. 6, a holder 19 is connected to the cartridge inserter/ejector opening 13b and defines the cartridge storing space 1a for storing the disk cartridge 2 within the chassis 16. The holder 19 is moved to the direction represented as an arrows A and B in FIG. 6 by the motor, the springs and a manual power or the like as holding the disk cartridge 2 which is stored in the cartridge storing space 1a. The holder 19 is provided with the shutter release mechanism for opening the opening for the hub 7 and the opening for the head 8 with respect to the shutter mechanism 9, which is disposed on the disk cartridge 2. The shutter release mechanism has an engaging piece for engaging the lever facing to the outside from the side face 5a of the cartridge body 5. When the disk cartridge 2 is inserted into the disk drive apparatus 1 from the cartridge inserter/ejector opening 13b, the engaging piece engages to the lever so as to slide the lever. Accordingly, the shutter of the disk cartridge 2 slides to open the opening for the hub 7 and the opening for the head 8.

In the disk drive apparatus illustrated in FIG. 6, the holder 19 lowers down into the side face of the spindle motor 17 (the direction represented as an arrow A) with omission of the disk cartridge 2 which is held by the holder 19 for the sake of convenience.

As shown in FIG. 5 and FIG. 7, the apparatus body 12 comprises a shielding member 30 when the disk cartridge 2 is stored in the cartridge storing space 1a. The shielding member 30 covers the surrounding area of the spindle motor 17, which is holding the magnetic disk 6 within the disk cartridge 2.

The shielding member 30 is made of expandable sealing member or elastic member such as low attitude rubber or the like. The shielding member 30 is provided on the chassis 16 as a wall in an approximately circle to cover the outer circumference of the opening for the hub 7 with connecting the lower half 4 of the disk cartridge 2 under pressure. At the same time, the shielding member 30 covers the outer circumference of the spindle motor 17. Therefore, in the disk drive apparatus 1, if the disc cartridge 2 is stored in the cartridge storing space 1a, the shielding member 30 covers the surrounding area of the spindle motor 17, which is holding the magnetic disk 6 within the disk cartridge 2, so that the motor space portion 31 is defined as a shielded space communicating to the inside of the spindle motor 17 as well as the inside of the disk cartridge 2.

The apparatus body 12 comprises a filter space portion 32 and a filter 33. The filter space portion 32 is provided in the cartridge storing space 1a facing to the cartridge inserter/ejector opening 13b. The filter 33 removes the dust or the like of the cartridge storing space 1a.

The filter space portion 32 has about the same width as that of the cartridge inserter/ejector opening 13b and comprises the chassis 16, a side wall 34 and the filter 33. The side wall 34 is in an approximately rectangular to be built up on the chassis 16. The filter 33 is mounted on the side wall 34. In the filter space portion 32, an intake aperture 35 is provided to be imbedded in an approximately center portion on the chassis 16, which is partitioned by the side wall 34.

Figure 8:
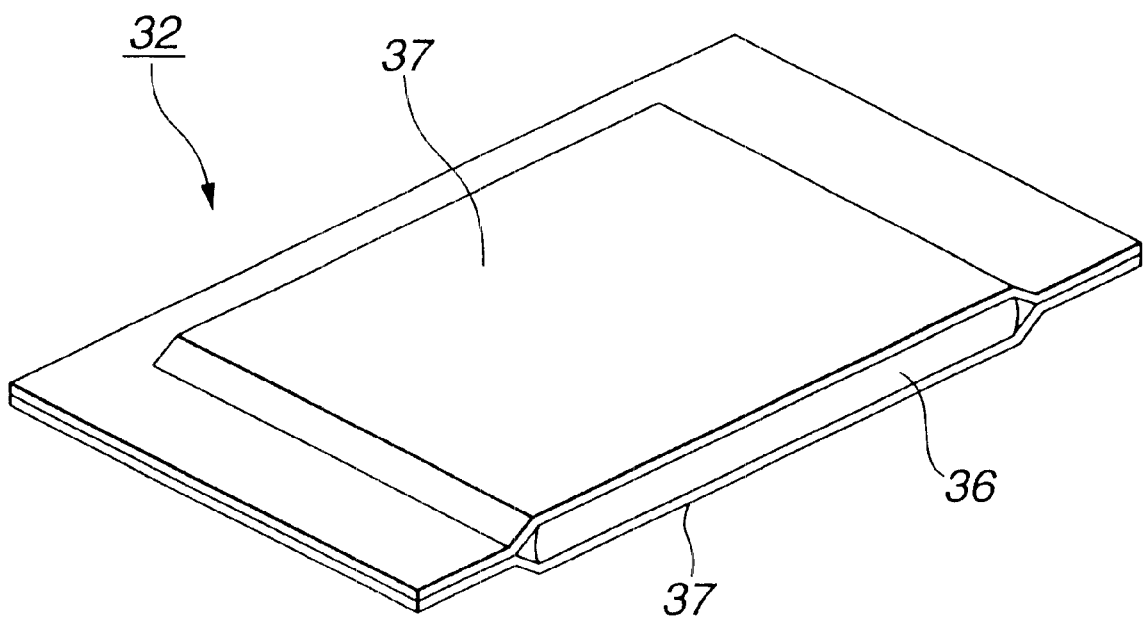
FIG. 8 is a cross sectional perspective view for illustrating a configuration of a filer.

The filter 33 is provided so as to close the filter space portion 32, which opens to the direction of the cartridge storing space 1a. The filter 33 is approximately flat as shown in FIG. 8. For example, a filter membrane 36 which is made of a material having a filtration function such as polytetrafluoroethylene (FTFE) is enclosed in a pair of protection membranes 37, which is made of a nonwoven fabric, for example, fabric having thermal plasticity such as polyethylene. The filter 33 is approximately in parallel with the chassis 16 and seals the filter space portion 32 by applying the outer circumference with width of 0.5–1.0 mm to the side wall 34 of the filter space portion 32 by fusion bonding of the protection membrane 37 and fixing means such as an adhesive tape and an adhesive.

The filter 33 is preferably characterized as follows; firstly, since the outer polluted air flows into the filter 33 and amount of debris of the collected dust or the like becomes large, the filter 33 preferably comprises a filter which is not clogged even when it is used for a long time (hereinafter referred to as a condition 1). Secondly, the filter 33 preferably comprises a filter having a high collectablity for the dust or the like, which is more than 99 percent (hereinafter referred to as a condition 2). Lastly, the filter 33 preferably comprises a filter having a less pressure loss in order to prevent the pressure inside of the spindle motor from lowering (hereinafter referred to as a condition 3).

In order to meet the condition 1, it is efficient to enlarge superficial area of the filter.

In order to meet the condition 2, it is preferable to use a filter with a high pressure loss. However, if the filter with a high pressure loss is used, the pressure loss becomes higher against the condition 3. In this case, the pressure loss becomes around 10 mm $H_2O$ at 5.3 cm/s.

In order to meet both of the condition 2 and the condition 3 without contradiction, it is preferable to enlarge the superficial area of the filter, to heighten the pressure loss per a unit area of the filter and to lower the pressure loss in totally. This state also meets the condition 1.

As mentioned above, the filter 33 is preferably to be approximately flat and is arranged so as to be approximately in parallel with the chassis 16. As a result of that, with respect to the filter 33, it is possible to enlarge the superficial area so that the above three conditions can be met.

As shown in FIG. 5 and FIG. 7, the apparatus body 12 is provided with a duct line 38 for communicating the above mentioned motor space portion 31 and the filter space portion 32. The duct line 38 is formed by a ventilation groove 39 and a seal member 40 such as an adhesive tape or a plate material or the like. The ventilation groove 39 is defined on the side face of the sealed space 1b of the chassis 16. The seal member 40 is stuck on the chassis 16 so as to cover the ventilation groove 39.

With respect to the disk drive apparatus 1, the groove defined on the chassis 16 involves a problem such that rigidity of the chassis 16 becomes lower. In other words, in connection with lowering of the rigidity of the chassis 16, there is a possibility in the disk drive apparatus 1 that vibrant mode with a low frequency, in which the chassis 16 vibrates up and down such as a dram around the spindle motor 17, occurs.

In order to solve the above problem, in the disk drive apparatus 1, the ventilation groove 39 is preferably formed on the chassis 16 as a linear groove connecting through a rotation center of the spindle motor 17. As a result, it is possible to prevent lowering of rigidity of the chassis 16 due to the groove defined on the chassis 16 so that the vibration occurred in the chassis 16 also can be prevented.

In the disk drive apparatus 1, which is arranged as stated above, the disk cartridge 2 is held by the holder 19 of the apparatus body 12 when the disk cartridge 2 is inserted into the inside of the apparatus body 12 from the cartridge inserter/ejector opening 13b. At this time, the shutter release mechanism of the holder 19 releases the shutter mechanism 9 of the disk cartridge 2 so that the opening for the hub 7 and the opening for the head 8 of the disk cartridge 2 are open. Further, in the disk drive apparatus 1, the disk cartridge 2 lowers down to the side face of the spindle motor 17 as being held by the holder 19.

In the disk drive apparatus 1, if the disk cartridge 2 lowers down to the side face of the spindle motor 17, the hub 10 of the magnetic disk 6 is sucked magnetically to the chucking magnet 23, which is imbedded in the disk table 25. The hub 10 of the magnetic disk 6 faces to the outside from the opening for the hub 7 of the disk cartridge 2. Accordingly, as well as the hub 10 is chucked by the disk table 25, a hub hall 10a of the hub 10 fits the spindle axis 21 of the spindle motor 17 and the magnetic disk 6 stored inside of the disk cartridge 2 is held by the spindle motor 17.

Also, in the disk drive apparatus 1, the shielding member 30 disposed on the chassis 16 covers the outer circumference of the spindle motor 17 as well as the outer circumference of the opening for the hub 7 with connecting the lower half 4 of the disk cartridge 2. Accordingly, the motor space portion 31 is defined as a shielded space communicating to the inside of the spindle motor 17 as well as the inside of the disk cartridge 2.

Thus, in the disk drive apparatus 1, the operation for storing the disk cartridge 2 in the cartridge storing space 1a is completed.

When the information signals are recorded or reproduced on the magnetic disk 6 in the disk drive apparatus 1, the spindle motor 17 rotatably drives the magnetic disk 6, which is stored in the disk cartridge 2. If the magnetic disk 6 is rotatably driven at a predetermined number of rotations in the disk drive apparatus 1, the rotation arm 26 of the head actuator 18 is rotatably driven by the voice coil motor 27 so that the head actuator 18 inserts into the inside of the disk cartridge 2 from the opening for the head 8 of the disk cartridge 2. Then, the floating head slider 29, which is mounted on an end portion of the suspension 28 disposed on the rotation arm 26 is lowered toward a signal recording surface of the magnetic disk 6, which is rotating.

However, the floating head slider 29 does not touch the magnetic disk 6. An air film is generated between the floating head slider 29 and the rotating magnetic disk 6 and the floating head slider 29 is held by a balance between the air film and elastic power of the suspension floating with a minute interval such as tens of $\mu m$ from a main surface of the magnetic disk 6.

By a magnet head which is loaded on the floating head slider 29 in the disk drive apparatus 1, the information signals are recorded or reproduced on the signal recording surface of the magnetic disk 6 without touching the signal recording surface of the magnetic disk 6.

When the use of the disk drive apparatus 1 is finished, by the reverse operation to the above mentioned operation, the disk cartridge 2 is ejected from the cartridge inserter/ejector opening 13b.

In the disk drive apparatus 1, a high speed rotation of the magnetic disk 6 within the disk cartridge 2 generates airflow on the main surface of the magnetic disk 6. Thus, a kind of operation by a centrifugal pump occurs and a vicinity of the rotation center of the magnetic disk 6 within the disk cartridge 2 gets to have a negative pressure.

The shielding member 30 is provided on the chassis 16 as a wall in an approximately annular to cover the outer circumference of the opening for the hub 7 with connecting the lower half 4 of the disk cartridge 2 in the disk drive apparatus 1 under pressure. At the same time, the shielding member 30 covers the outer circumference of the spindle motor 17. The shielding member 30 covers the surrounding area of the spindle motor 17, which is holding the magnetic disk 6 within the disk cartridge 2, so that the motor space portion 31 is defined as a shielded space communicating to the inside of the spindle motor 17 as well as the inside of the disk cartridge 2.

Thus, the disk drive apparatus 1 can prevent the air containing the dust or the like from flowing into the inside of the disk cartridge 2 through the opening for the hub 7 in advance, so that the air within the disk cartridge 2 can be kept clean.

Further, in the disk drive apparatus 1, since the motor space portion 31 communicates to the inside of the disk cartridge 2 thorough the opening for the hub 7, the inside of the motor space portion 31 comes to have a negative pressure. In the disk drive apparatus 1, since the motor space portion 31 communicates to the filter space portion 32 through the duct line 38, sucking force is generated on an intake aperture 35 of the filter space portion 32, so that clean air flows into the inside of the filter space portion 32 from the cartridge storing space 1a via the filter 33. Then, the clean air is supplied to the inside of the motor space portion 31 through the duct line 38.

Accordingly, the disk drive apparatus 1 can supply the clean air to the inside of the disk cartridge 2 to suppress the extreme lowering of the pressure inside of the motor space portion 31 without polluting the inside of the disk cartridge 2 by the dust or the like.

Therefore, the disk drive apparatus 1 can prevent in advance the pollution of the inside of the disk cartridge 2 by bursting and flying in all directions of a grease or an operational fluid inside of the spindle motor 17 or air bubbles in the magnet fluid seal.

Further, in the disk drive apparatus 1, the air in the cartridge storing space 1a is sucked via the filter 33 to be discharged to the side face of the motor space portion 31. Accordingly, the disk drive apparatus 1 can clean the air within the cartridge storing space 1a.

A portion of the air is supplied from the outside of the cartridge inserter/ejector opening 13b to the filter space portion 32 through the filter 33 in the disk drive apparatus 1. In the disk cartridge 2, the clean air is sucked from the opening for the hub 7 to circulate within the cartridge body 5. Then, the clean air is discharged from the opening for the head 8 to the cartridge storing space 1a.

Thus, the pressure within the cartridge storing space 1a is slightly higher than that of the outside in the disk drive apparatus 1. Accordingly, the disk drive apparatus 1 can prevent in advance the outer air containing the dust or the like from inserting into the cartridge storing space 1a.

Further, the disk drive apparatus 1 is provided with the filter space portion 32 facing the cartridge inserter/ejector opening 13b of the cartridge storing space 1a. Therefore, in the disk drive apparatus 1, even if the outer air containing the dust or the like inserts from the cartridge inserter/ejector opening 13b, the filter 33 disposed in the filter space portion 32 can collect the dust or the like efficiently so that pollution within the cartridge storing space 1a can be prevented.

As described above, the disk drive apparatus 1 can perform the extremely high dustproof when recording or reproducing the information signals on the magnetic disk 6, which is stored in the disk cartridge 2. Therefore, it is possible to prevent the defects in recording and reproducing of the information signals, hurting the magnetic disk 6 by the dust or the like adhered to the magnetic disk 6 and physical destruction (head crush) of the magnet head, which is loaded on the floating head slider 29.

Figure 9:
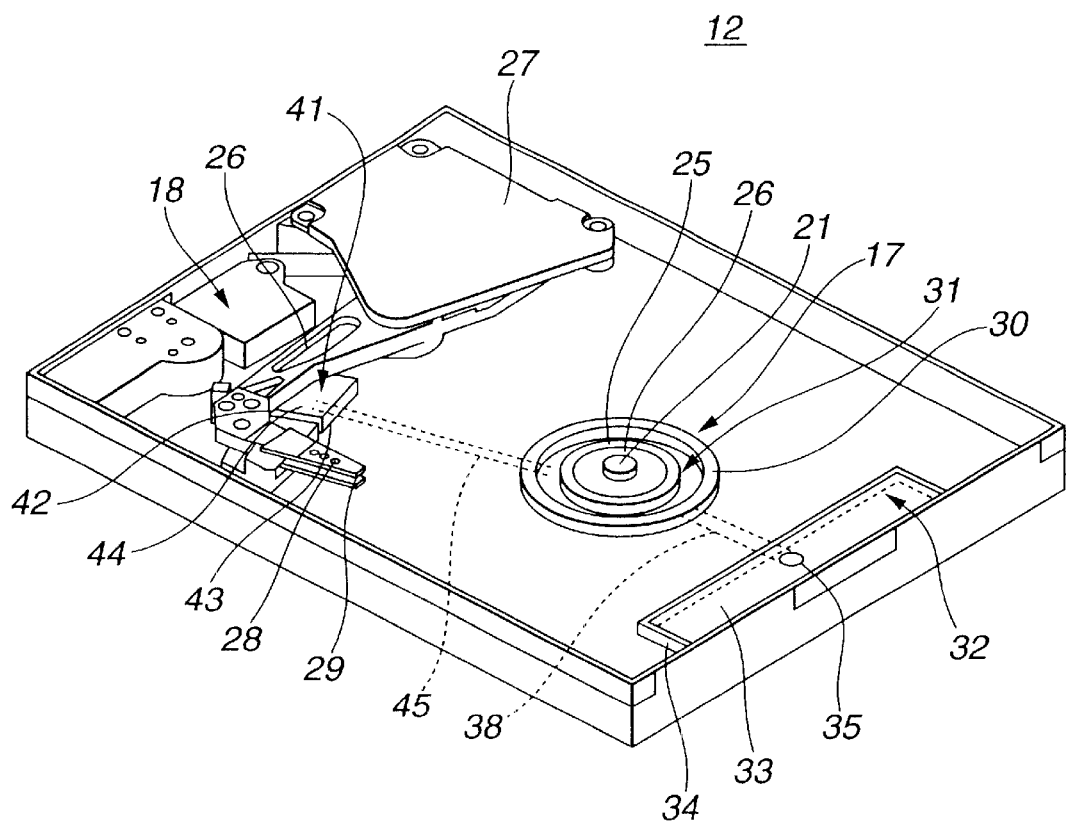
FIG. 9 is a schematic perspective view for illustrating another configuration of the disk drive apparatus according to the present invention.
Figure 10:
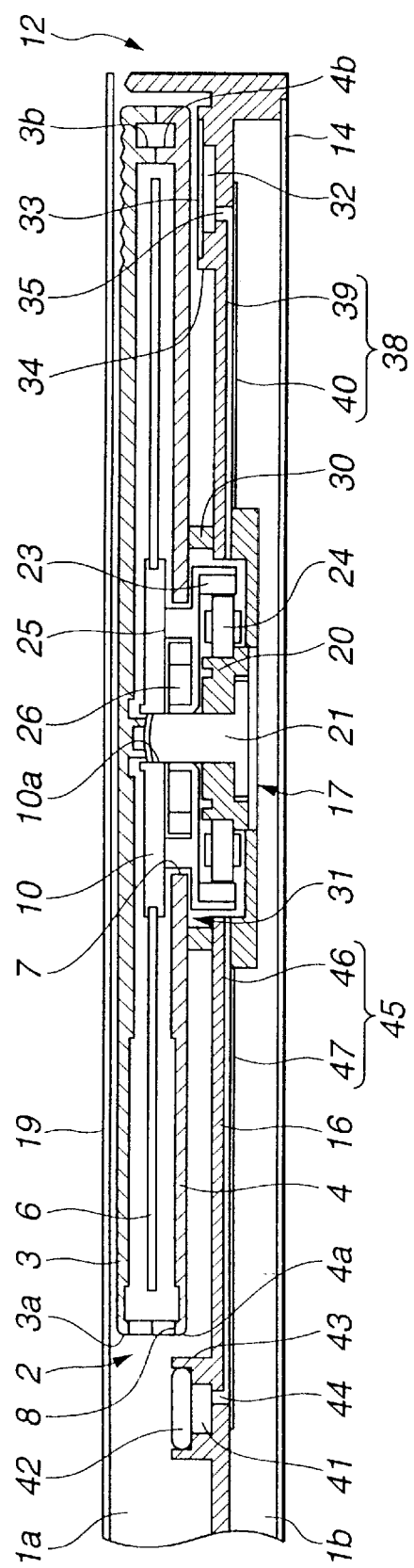
FIG. 10 is a schematic cross sectional view for illustrating a disk cartridge stored in the disk drive apparatus according to the present invention.

As shown in FIG. 9 and FIG. 10, the disk drive apparatus 1 is configured such that a second filter space portion 41 and a second filter 42 are arranged in a vicinity of the head actuator 18 in the cartridge storing space 1a.

The second filter space portion 41 is configured with the chassis 16, a second side wall 43 in an approximately rectangular, which is build up on the chassis 16 and a second filter 42 disposed on the second side wall 43. A second intake aperture 44 is defined on the second filter space portion 41 at an approximately center portion of the chassis 16, which is partitioned by the second side wall 43.

The second filter 42 is provided so as to close the second intake aperture 41, which is opening to the cartridge storing space 1a.

The apparatus body 12 is provided with a second duct line 45 for communicating the motor space portion 31 and the second filter space portion 41 each other. The second duct line 45 is formed with a second ventilation groove 46 and a second seal member 47. The second ventilation groove 46 is defined on the side face of the shielded space 1b of the chassis 16. The second seal member 47 such as an adhesive tape or a plate material or the like, which is stuck to the chassis 16 to cover the second ventilation groove 46.

The second ventilation groove 46 is preferably configured on the chassis 16 as a linear groove, which passes through a rotation center of the spindle motor 17. Accordingly, it is possible to prevent lowering of rigidity of the chassis 16 due to configuring a groove on the chassis 16. It is also possible to prevent vibrations from occurring in the chassis 16.

In the disk drive apparatus 1 configured as described above, since the second filter space portion 41 communicates to the motor space portion 31 through the second duct line 45, a suction power is generated on the second intake aperture 44 of the second filter space portion 41. Therefore, the clean air is supplied inside of the second filter space portion 41 from the cartridge storing space 1a through the second filter 42 and the clean air is further supplied inside of the motor space portion 31 via the second duct line 45.

Accordingly, the disk drive apparatus 1 can supply the clean air inside of the disk cartridge 2, so that it is possible to suppress extreme lowering of the pressure within the motor space portion 31 without polluting the inside of the disk cartridge 2 by the dust or the like.

Therefore, the disk drive apparatus 1 can prevent in advance the inside of the disk cartridge 2 from being polluted by bursting and flying in all directions of a grease or an operational fluid inside of the spindle motor 17 or air bubbles in the magnet fluid seal.

Further, in the disk drive apparatus 1, the air in the cartridge storing space 1a is sucked via the second filter 42 into the side face of the motor space portion 31. Accordingly, the disk drive apparatus 1 can clean the air within the cartridge storing space 1a.

The disk drive apparatus 1 circulate the clean air sucked from the opening for the hub 7 of the disk cartridge 2 in the inside of the cartridge body 5 to be discharged from the opening for the head 8 to the cartridge storing space 1a. The second filter space portion 41 and the second filter 42 are arranged in a vicinity of the head actuator 18 within the cartridge storing space 1a, so that the second filter space portion 41 and the second filter 42 are arranged far from the cartridge inserter/ejector opening 13b. Accordingly, there is a bare possibility that the air inserted from the outside flows into the second filter 42 but there is a strong possibility that the air, which has been filtered more than once flows into the second filter 42.

In the above case, there is less necessity for a second filter to collect the dust or the like compared to a filter 35 disposed on the side face of the cartridge inserter/ejector opening 13b. Therefore, it is possible to use a filter with a less pressure loss.

Accordingly, the second filter 42 preferably uses a filter with a less pressure loss in order to prevent lowering of the pressure within the spindle motor 17. In the other words, the second filter 42 is preferably near to a circulation filter, which is usually used for a fixed hard disk drive apparatus. Specifically, an electret type (a perpendicular type) filter is preferable such that the collecting efficiency of the dust or the like thereof ranges from 30% to 70% and a pressure loss is around 1 mm $H_2O$ at 5.3 cm/s.

The second filter 42 should be basically disposed far as much as possible from the cartridge inserter/ejector opening 13b. However, the second filter 42 is preferably disposed on a vicinity of the opening for the head 8 of the disk cartridge 2, which is stored inside of the cartridge storing space 1a from a view point of efficiency.

The second filter space portion 41 and the second filter 42 are preferably arranged on the location not to overlap with the disk cartridge 2, which is stored in the cartridge storing space 1a.

In the above state, the second filter space portion 41 and the second filter 42 do not intervene the disk cartridge 2 in the direction of the height. Therefore, it is possible to use the cartridge storing space 1a efficiently and to thicken the wall of the second filter 42. As a result, the cartridge storing space 1a becomes suitable for the use of the electret type (the perpendicular type) filter.

The disk drive apparatus 1 may not be provided with the second filter 42 in the second filter space portion 41 and may supply air from the cartridge storing space 1a to the motor space portion 31 through the second duct line 45.

When the duct line 38 and the second duct line 45 are configured in the disk drive apparatus 1, the ventilation groove 39 and the second ventilation groove 46 may be defined on the chassis 16 in the side face of the cartridge storing space 1a opposing to the side face of the shielded space 1b of the chassis 16. Also, the ventilation groove 39 and the second ventilation groove 46 may be covered by the seal member 40 and the second seal member 47, respectively.

The driving drive apparatus according to the present invention may not limited to the disk drive apparatus 1 using the above described magnetic disk, but may be a disk drive apparatus using an optical disk or an optical magnetic disk or the like.

What is claimed is:

1. A disk drive apparatus for recording and/or reproducing information signals on a disk-shaped recording medium, which is stored rotatably within a disk cartridge comprising:

a case having a cartridge storing space in which said disk cartridge is inserted;

rotatable driving means for holding the disk-shaped recording medium, which is stored within said disk cartridge, which is inserted in said cartridge storing space and for rotatably driving the disk-shaped recording medium wherein said rotatable driving means includes a spindle motor for rotatably driving the disk-shaped recording medium;

shielding means for defining a shielded space by covering a surrounding area of said rotatable driving means for holding said disk-shaped recording medium wherein said shielding means is provided on said case as a wall formed in approximately a circular shape to cover and surround the outer circumference of said spindle motor so that the shielded space communicates with the inside of both the spindle motor and the cartridge storing space;

a filler space portion including a filter for removing foreign particles inside of said cartridge storing space; and wherein said shielded space and said filter space portion communicate with one another.

2. A disk drive apparatus according to claim 1, wherein said shielding means covers the outer circumference of said rotatably driving means and comprises a member of connecting under pressure configured so as to connect to said disk cartridge under pressure.

3. A disk drive apparatus according to claim 2, wherein said member for connecting under pressure is made of an elastic material.

4. A disk drive apparatus according to claim 1, wherein said filter is arranged so as to be positioned in a vicinity of the side face in said cartridge storing space, in which said disk cartridge is inserted.

5. A disk drive apparatus according to claim 1, wherein said disk cartridge is provided with an opening in which a head for recording and/or reproducing said disk shape recording medium is inserted;

said filter is arranged so as to be positioned in a vicinity of said opening, which is defined in said disk cartridge of said cartridge storing space when said disk cartridge is stored in said cartridge storing space.

6. A disk drive apparatus according to claim 1, wherein said filter is arranged to be positioned so as not to overlap with said disk cartridge in said cartridge storing space when said disk cartridge is stored in said cartridge storing space.

7. A disk drive apparatus according to claim 1, and further including a supporting plate for supporting said driving means;

wherein said shielded space and said cartridge storing space communicate with each other via a duct line having a linear groove which passes through a rotation center of said disk-shaped recording medium, which is defined on said supporting plate.

* * * * *